(12) United States Patent
Hamburger et al.

(10) Patent No.: US 11,231,804 B2
(45) Date of Patent: Jan. 25, 2022

(54) PRESSURE SENSITIVE DISPLAY DEVICE

(71) Applicant: MTTECH INTERACTIVE MULTIMEDIA SYSTEMS LTD, Rehovot (IL)

(72) Inventors: Gal Benjamin Hamburger, Rehovot (IL); Gabriel Gelerenter, Tel Aviv (IL)

(73) Assignee: MTTECH INTERACTIVE MULTIMEDIA SYSTEMS LTD, Rehovot (IL)

( * ) Notice: Subject to any disclaimer, the term of this patent is extended or adjusted under 35 U.S.C. 154(b) by 0 days.

(21) Appl. No.: 17/045,200

(22) PCT Filed: Apr. 11, 2019

(86) PCT No.: PCT/IL2019/050406
§ 371 (c)(1),
(2) Date: Oct. 5, 2020

(87) PCT Pub. No.: WO2019/198082
PCT Pub. Date: Oct. 17, 2019

(65) Prior Publication Data
US 2021/0165545 A1 Jun. 3, 2021

Related U.S. Application Data

(60) Provisional application No. 62/656,537, filed on Apr. 12, 2018.

(51) Int. Cl.
*G06F 3/046* (2006.01)
*G06F 3/041* (2006.01)
(Continued)

(52) U.S. Cl.
CPC ........... *G06F 3/04144* (2019.05); *G01G 3/15* (2013.01); *G06F 3/046* (2013.01); *G06F 3/0428* (2013.01);
(Continued)

(58) Field of Classification Search
CPC .... G06F 3/04144; G06F 3/046; G06F 3/0428; G06F 2203/04108; G06F 2203/04104; G01G 3/15
See application file for complete search history.

(56) References Cited

U.S. PATENT DOCUMENTS 5,367,129 A * 11/1994 Lahl, Jr. ............... A63B 47/008
177/229
7,825,903 B2    11/2010 Anastas et al.
(Continued)

FOREIGN PATENT DOCUMENTS

CN        202135925 U    2/2012
CN        106055175 A    10/2016

OTHER PUBLICATIONS

Whirlpool Corporation: "Whirlpool's Futuristic Stovetop is Basically a Giant Tablet You Can Cook On", Youtube—Reviewed Channel, Sep. 7, 2014, URL : < https://www.youtube.com/watch?v=QPG9Pk2bbuE >, retrieved from the Internet on Jan. 12, 2021.

*Primary Examiner* — Ibrahim A Khan
(74) *Attorney, Agent, or Firm* — Vorys, Sater, Seymour & Pease LLP; William Klima

(57) ABSTRACT

A system that includes a multi-touch-sensitive display unit and sensing modules that are associated with the display unit for sensing force applied onto the display unit. The display unit is configured to display the sensed signal that is indicative of the force that is applied onto the display unit, in association with the position of the application of force. One realization of the system is for weighing objects on the touch-sensitive display unit. A user may place an object on the display unit and trigger weighing process by an interface of the multi-touch-sensitive display unit. The weighing process is carried out by the sensing modules and the weight
(Continued)

of the object is displayed on the display unit in association with the object, e.g. in the vicinity to where the object is placed on the display unit.

20 Claims, 5 Drawing Sheets

(51) Int. Cl.
  G01G 3/15 (2006.01)
  G06F 3/042 (2006.01)
(52) U.S. Cl.
  CPC .............. *G06F 2203/04104* (2013.01); *G06F 2203/04108* (2013.01)

(56) References Cited

U.S. PATENT DOCUMENTS

| | | | |
|---|---|---|---|
| 8,419,433 B2 | 4/2013 | Do et al. | |
| 10,035,592 B1* | 7/2018 | Hanlon | G01M 1/10 |
| 2008/0255790 A1* | 10/2008 | Roquemore | G01G 23/017 |
| | | | 702/101 |
| 2008/0296387 A1* | 12/2008 | Sanders | G06K 7/1096 |
| | | | 235/462.41 |
| 2009/0001166 A1* | 1/2009 | Barkan | G06K 7/10801 |
| | | | 235/462.14 |
| 2009/0171801 A1* | 7/2009 | Ryo | G06F 3/04895 |
| | | | 705/23 |
| 2009/0322706 A1* | 12/2009 | Austin | G06F 3/0488 |
| | | | 345/175 |
| 2010/0044157 A1* | 2/2010 | Marshall | G07G 1/0036 |
| | | | 186/61 |
| 2010/0219693 A1* | 9/2010 | Azancot | H02J 50/90 |
| | | | 307/104 |
| 2010/0238114 A1* | 9/2010 | Vartanian | G09G 3/3208 |
| | | | 345/168 |
| 2012/0260220 A1* | 10/2012 | Griffin | G06F 3/017 |
| | | | 715/863 |
| 2013/0193208 A1* | 8/2013 | Collins | G06K 7/10821 |
| | | | 235/440 |
| 2013/0285977 A1 | 10/2013 | Baharav et al. | |
| 2013/0320084 A1* | 12/2013 | Amada | G06Q 20/208 |
| | | | 235/383 |
| 2014/0104320 A1* | 4/2014 | Davidson | G06F 3/04886 |
| | | | 345/681 |
| 2015/0277636 A1* | 10/2015 | Holmgren | G02B 19/0014 |
| | | | 345/175 |
| 2016/0067866 A1* | 3/2016 | Sekar | B25J 9/0084 |
| | | | 99/348 |
| 2016/0139690 A1 | 5/2016 | Chang | |
| 2016/0252390 A1* | 9/2016 | Batsikouras | G01G 19/52 |
| | | | 177/25.13 |
| 2016/0282970 A1 | 9/2016 | Evreinov et al. | |
| 2017/0153153 A1* | 6/2017 | Eventoff | G06F 3/0446 |
| 2017/0242519 A1 | 8/2017 | Tao et al. | |
| 2020/0296807 A1* | 9/2020 | Kobida, Jr. | H05B 6/1245 |
| 2021/0080114 A1* | 3/2021 | Liu | F24C 7/085 |

* cited by examiner

PRESSURE SENSITIVE DISPLAY DEVICE

TECHNOLOGICAL FIELD

The present disclosure is in the field of interactive display systems.

BACKGROUND

The control and operation of electronic items has largely moved from mechanical to touch interfaces. Touch screens are widely used to provide an intuitive pointing surface. It provides a compact, convenient and simple input means for a user. For example, touch screens are used in mobile phones, digital cameras, laptops, household items like microwave ovens, air conditioners, refrigerators, freezers, water heaters, security applications like fingerprint lock, electronic door locks and many more. In most touch screen applications, the touch sensitive surface is permanently mounted on a display device such as a cathode ray tube (CRT), or a liquid crystal display (LCD). Touch screens can use resistive, capacitive, acoustic, or infrared sensors.

Generally, the touch surface or panel enables a user to perform functions specific to a particular use. For example, the touch panel of a mobile phone provides the functionality to control the features of the mobile phone. Interactive gaming tables provide playing surface for players and control panel to administer the game. Touch screens and walls are used in education system for making the learning more interactive and interesting. In all of these applications, touch panel has the capability for a specific usage and does not provide freedom to the user for different applications. Consequently, the user needs to interact with multiple devices for performing different tasks. Furthermore, these touch panels have the provision of a single touch which limits the working capability.

In light of the above limitations, it is desirable to provide an interactive touch system which enables the user to perform multiple functions. The touch system should also facilitate multiple users to work on it simultaneously. The interactive systems described herein come to address this need.

GENERAL DESCRIPTION

The present disclosure concerns a system that includes a multi-touch-sensitive display unit and sensing modules that are associated with the display unit for sensing force applied onto the display unit. It is to be noted that the term "touch" may refer to a touch of a user, e.g. a human or a touch of an object, such as pots, canisters, etc. The display unit is configured to display the sensed signal that is indicative of the force that is applied onto the display unit, in association with the position of the application of force. One realization of the system is for weighing objects on the touch-sensitive display unit. A user may place an object on the display unit and trigger weighing process by an interface of the multi-touch-sensitive display unit. The weighing process is carried out by the sensing modules and the weight of the object is displayed on the display unit in association with the object, e.g. in the vicinity to where the object is placed on the display unit.

Therefore, a first aspect of the present disclosure concerns a system that includes a touch-sensitive display unit (may be referred throughout the application as display unit) for displaying an image. The display unit is configured to detect a touch of one or more objects onto the display unit, the touch of the object affects the image that is displayed thereon. The display unit may be formed from a few layers, such as a layer of a display, a layer of touch-sensitive surface and a protective layer.

The system further includes one or more sensing modules that are associated with the touch-sensitive display unit and configured to generate a sensed signal proportional to a force applied onto the display unit in a direction normal to its surface.

One or more control units are coupled to the sensing modules and to the display unit and are configured to receive the sensed signal. The one or more control unit generate an output signal indicative of the force applied onto the display unit based on the sensed signal. The output signal is communicated to the touch-sensitive display unit, and the display units is configured to display data related to the force.

In order to be configured for weighing objects, at least a portion of the display unit is planar for placing objects thereon. Therefore, the display unit is typically configured for horizontal orientation to define a planar outer face and for determining weight of objects placed thereon.

The system is configured to detect multiple touches of objects thereon that may affect, simultaneously, the image that is displayed by the display unit. For example, a plurality of objects may be placed on the display unit, each is weighed by the system independently and data of the weight of each of the objects is displayed on the display unit in association with its corresponding object.

In some embodiments of the system, at least one of the sensing modules includes a proximity sensor. The proximity has a first member associated and movable with the display unit and a second member. The sensed signal that is proportional to the force that is applied onto the display unit is proportional to the proximity between the first and the second members. In other words, the proximity between the two members is indicative of the force that is applied onto the display unit.

In some embodiments of the system, the two members define a hall-effect sensor couple. Namely, one of the members is being a magnet and the other being a hall-effect sensor. The first member may be attached to an inner face of the touch-sensitive display unit and is moveable therewith, upon application of force on the touch-sensitive display unit. The second member is disposed on a platform, and the hall-effect sensor couple is configured to provide a hall-effect signal based on the distance between the two members and generate the sensed signal.

In some embodiments of the system, the second member is disposed on a displaceable platform configured to displace towards the display unit to an extent proportional to the force applied on the display unit.

In some embodiments of the system, a portion of the display unit is displaced in a first extent proportional to the force applied onto said unit and the displaceable platform is displaced in a second, amplified extent. This allows to amplify the sensed signal of the at least some of the sensing modules to facilitate discerning between different extents of force application.

The amplified extent of the displaceable platform may be performed by an amplification unit, which can be mechanical-, pneumatic- or hydraulic-based.

For example, the amplification unit may include a first arm that is attached to or supporting an inner face of the touch-sensitive display unit and is movable therewith. Typically, the first arm is attached at the vicinity of the first member of the proximity sensor. A second arm is supporting the displaceable platform and a movement of the touch-sensitive display unit together with the first arm is translated to an amplified movement of the second arm, resulting in an amplified displacement between the first and the second members.

In some embodiments of the system, at least one of the sensing modules comprises a load cell that is configured to sense the force applied on the touch-sensitive display unit and generate the sensed signal. It is to be noted that some sensing modules may include load cells and other sensing modules may include proximity sensors, as described above, that provide together a common sensed signal that is translated to the force, or weight, that is applied on the display unit.

The load cell may be of any type, such as hydraulic, pneumatic, and strain gauge.

In some embodiments of the system, the display unit is horizontal and the system further includes a plurality of load cells fixed on a base structure and supporting the display unit. In this embodiments, the display unit is supported merely by the load cells and floats thereon.

In some embodiments of the system, the base structure includes a levelling arrangement for levelling the base structure. This allows to level the load cells that are fixed to the base structure, e.g. for a calibration.

In some embodiments, the system includes a planar light-transmissive medium, e.g. a polymer or glass, permitting transmission of light in a direction parallel to a planar outer face of the touch-sensitive display unit.

The system further includes one or more light emitters configured to emit light into the medium and one or more light detectors configured to detect light from at least one of the emitters. The detected light is analyzed by a processor to identify changes in the expected characteristics of the light. The identified changes in the characteristics of the light are indicative of at least one of (i) degree of force applied on the touch-sensitive display unit, which is indicative of the weight in the event that the plane is horizontal, and (ii) the location where the force is applied onto the touch-sensitive display unit.

In other words, the emitters emit identical light beams at a very high frequency, which are constantly detected by the light detectors. Application of force on the display unit, and hence on the light-transmissive medium, causing an interference in the light path of the light beams that are emitted by the emitters that results in a change of the characteristics of the lights, such as delay of time of arrival to the detector, frequency shifting, etc. This detected light beams are analyzed and the changes of the light characteristics are identified by processing modules of the system that generate based thereon light data that is indicative of the (i) degree of force applied on the touch-sensitive display unit, which is indicative of the weight in the event that the plane is horizontal, and/or (ii) the location where the force is applied onto the touch-sensitive display unit. The system is fed with this light data and affect the displayed image based thereon.

In some embodiments of the system, the light-transmissive medium includes light-reflective edges. The optical path of the light between the emitter and the detector includes multiple reflections from said light-reflective edges. For example, the light beam that is emitted from an emitter may be reflected from a first edge and propagates to a second edge to be reflected therefrom towards the first edge again. Each reflection location on the first and second edges may be slightly spatially deviated from a previous reflection location until it is received by the light detector.

In some embodiments of the system, the optical path spans throughout a major portion of the medium. Therefore, the light-transmissive medium is sensitive for application of force generally in its entirety.

In some embodiments of the system, the medium is rectangular, namely the light-reflective edges that confines the medium, are having a rectangular shape. The light emitters and the lights detectors form optical couples, each couple includes a light emitter and a light detector that is configured to detect light from its light emitter member.

In some embodiments, one member of the couple is disposed proximal to one light-reflective edge and the other at the opposite light-reflective edge of the rectangle.

In some embodiments of the system, the sensing modules are arranged in an irregular array. In other words, there is no defined symmetry between groups of the sensing modules.

In some embodiments of the system, the irregular array includes sub-arrays, each sub-array includes an internal linear or symmetric arrangement. Each sub-array is arranged in a non-linear arrangement, namely non-symmetric arrangement, with respect to one or more, or even any other sub-arrays.

In some embodiments, the system is configured to measure weights of a plurality of objects simultaneously.

In some embodiments of the system, the touch-sensitive display unit includes a protective layer that is disposed on the touch-sensitive display unit. The protective layer serves as a barrier between the touch-sensitive display unit and objects that are placed on or pushed against the touch-sensitive display unit. It is to be noted, that in some embodiments, the protective layer may form the light-transmissive medium as described above.

A second aspect of the present disclosure provides a system that includes a touch-sensitive display unit for displaying an image and configured to detect a touch of one or more objects onto said unit to thereby affect said image, wherein the touch-sensitive display unit defines a planar outer face.

The touch-sensitive display unit includes a planar light-transmissive medium permitting transmission of light in a direction parallel to the outer face. The touch-sensitive display unit further includes one or more light emitters configured to emit light into the medium and one or more light detectors configured to detect light from at least one of the emitters, wherein changes in characteristics of the light detected by a detector is indicative of at least one of (i) degree of force applied on the touch-sensitive display unit and (ii) the location where the force is applied onto the touch-sensitive display unit.

In some embodiments of the system the light-transmissive medium includes light-reflective edges. The optical path of the light between the emitter and the detector includes multiple reflections from said light-reflective edges.

In some embodiments of the system, the optical path spans throughout a major portion of the medium.

In some embodiments of the system, the medium is rectangular. The light emitters and the lights detectors are two members of an optical couple, in which the detector is configured to detect the light from its coupled emitter; and wherein one member of the couple is being disposed proximal to one edge and the other at the opposite edges of the rectangle.

Another aspect of the present disclosure provides a handheld tool for operating a touch-sensitive display unit. The tool includes an engagement portion that is configured for affecting the touch-sensitive display unit upon engagement with the touch-sensitive display unit. For example, the image that is displayed on the touch-sensitive display unit may response to engagement of the engagement portion.

The hand-held tool further includes a gripping portion that is configured for gripping the hand-held tool; and a communication module for communicating with the touch-sensitive display unit.

The engagement portion includes a first force-sensitive unit that is configured to sense, upon engagement with the touch-sensitive display unit, the amount of force applied by the engagement portion on the touch-sensitive display unit and generate first pressure data based thereon. The communication module is configured to transmit the first force data to the touch-sensitive display unit to trigger a response in a displayed image of the display unit based thereon, namely affect the displayed image.

Therefore, the hand-held tool is configured as an input device for the display unit that transmits data thereto to affect the image that is displayed thereby and/or operate the display unit.

In some embodiments of the hand-held tool, the gripping portion includes a second force-sensitive unit that is configured to sense the amount of force applied on the gripping portion and generate second force data. The communication module is configured to transmit the second force data to the touch-sensitive display unit to trigger a response based thereon and/or the first pressure data together. The first and second force data may be translated to a plurality of gestures, each triggers a different response in the image of the display unit.

In some embodiments of the hand-held tool, the engagement portion (at the tip thereof) includes a capacitance meter that is configured to sense the rate of movement of the engagement portion from or to the touch-sensitive display unit and generates movement data. The communication module is configured to transmit the movement data to the touch-sensitive display unit and triggers a response based thereon. Typically, the capacitance meter is disposed at the tip of the engagement portion.

In some embodiments of the hand-held tool, the first force-sensitive unit comprises a plurality of first force sensors. The first force data is constituted by sensed data from each of the plurality of first force sensors. The combination of sensed data from the different first force sensors may trigger different gestures on the display unit.

In some embodiments of the hand-held tool, the second force-sensitive unit comprises a plurality of second force sensors. The second force data is constituted by sensed data from each of the plurality of second force sensors. The combination of sensed data from the different second force sensors may trigger different gestures on the display unit.

The second force sensors may be formed on the circumference of a body of the hand-held tool, namely on the circumference of a body portion of the gripping portion, such that the second force-sensitive unit is configured to sense independently the force that is applied on each portion of the circumference of the gripping portion.

In some embodiments, the engagement portion includes an imaging unit for capturing images and communicate them to the display unit for affecting the displayed image on the display unit. Furthermore, the imaging unit is configured to provide additional gestures that are triggered by imaged data that is provided by the imaging unit in combination with the data that is provided by the first and second force-sensitive units or by the imaging data alone. This permits the ease of use for the user with new kind of interactive gestures.

Yet another aspect of the present disclosure provides an induction system that combines the functionality of an induction hob and an interactive display unit.

The induction system includes a display unit layer configured for displaying an image. An electromagnetic-blocking layer is formed on the display unit layer to form a barrier between the display unit layer and an induction-generating layer that is formed on the electromagnetic-blocking layer. The induction-generating layer is configured for generating an electromagnetic induction for heating suitable conductive tools, such as pots, that are placed thereon, and the electromagnetic-blocking layer is configured for blocking at least a portion of the electromagnetic induction to protect electrical components of the display unit. The layers are formed such that displaying components of the display unit, e.g. LEDs, are visible through the induction-generating layer and the electromagnetic-blocking layer.

In some embodiments, to allow the visualization of the display unit through the layers, the electromagnetic-blocking layer is having a latticed formation. The display unit components are visualized through the gaps of the lattice formation. In the same manner, the induction-generating layer is formed with matching gaps/spaces to allow the visualization of the display unit therethrough.

In some embodiments of the induction system, the induction-generating layer comprises an induction element, e.g. induction coil, that is formed within a medium, e.g. glass or polymer. In some embodiments, the induction element may be disposed in an induction space within the medium and is configured for retraction from the induction space into a retracted space. For example, when a user desires to use the induction functionality, the induction element is extracted into the induction space and may be operated for heating. When the induction element is not being used, it may be retracted into a retracted space to allow the portion of the display unit below the induction space to be visualized, so as to display images therethrough.

In some embodiments of the induction system, the space is positioned outside vertical boundaries of the display unit layer. In other words, the retracted space is formed in a position where there is no layered formation of the display unit layer, the induction-generating layer and the electromagnetic-blocking layer, so when the induction element is retracted, it does not block the visualization any portion of the display unit.

In some embodiments, the induction system further includes a touch-sensitive surface associated with the display unit, namely a portion thereof is associated with a corresponding portion of the display unit, and is configured to detect a touch of one or more objects thereon to thereby affect the image on the display unit.

It should be noted that embodiments of the induction system may be combined with any of the embodiments of the system described above to form an integral system that includes an interactive display unit and is configured for weighing and heating objects.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5A shows a top-view of the arrangement; and FIG. 5B shows a side-view of the arrangement of FIG. 5A.

DETAILED DESCRIPTION OF EMBODIMENTS

The following figures are provided to exemplify embodiments and realization of the invention of the present disclosure.

Figure 1:
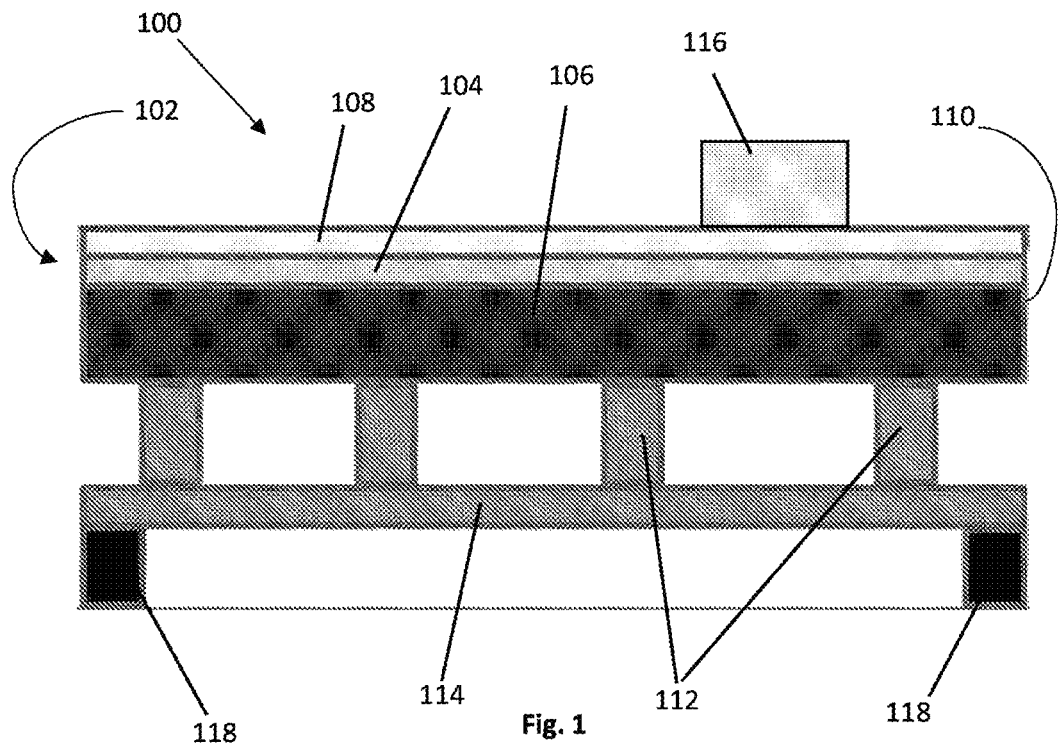
FIG. 1 is a schematic illustration of a longitudinal cross-section of non-limiting example of an embodiment of the system of the present disclosure.

Reference is first made to FIG. 1, which is a schematic illustration of a longitudinal cross-section of non-limiting example of an embodiment of the system of the present disclosure. The system 100 includes a touch-sensitive display unit 102 that is constituted by a touch-sensitive surface 104 that is formed on a display 106, and a protective layer 108 that is disposed over the touch-sensitive surface 104 to protect the sensitive components of the touch-sensitive surface 104 and the display 106. The touch-sensitive display unit 102 is further constituted by a casing 110 that encases together the touch-sensitive surface 104, the display 106 and the protective layer 108. The touch-sensitive display unit 102 is configured to display images and to detect a touch of a user or objects thereon, to thereby affect the displayed image.

Sensing modules 112 are fixed to a base structure 114 and supporting the display unit 102 such that the display unit floats on the sensing modules 112. The sensing modules 112 are configured to sense force that is applied on different portions of the display unit 102 and generate a sensed signal based thereon. The sensed signal is communicated to the display unit for displaying in a portion of the display 106, an image that is indicative of the force that is applied on the display unit 102. For example, if an object 116 is placed on the display unit 102, the sensing modules 112 sense the weight thereof and communicate data indicative of the weight to the display unit 102. The display unit 102 is configured to receive the data and display an image related to the weight of the object 116 in association with the object 116, e.g. at the vicinity thereof.

The base structure 114 sits on levelling elements 118, which are configured to allow the levelling of the base structure 114.

It is to be noted that the calculation of the force may be based on signals that derive from one or more sensing modules.

In the figures throughout the application, like elements of different figures were given similar reference numerals shifted by the number of hundreds corresponding to the number of the figures. For example, element 202 in FIG. 2 serves the same function as element 102 in FIG. 1.

Figure 2:
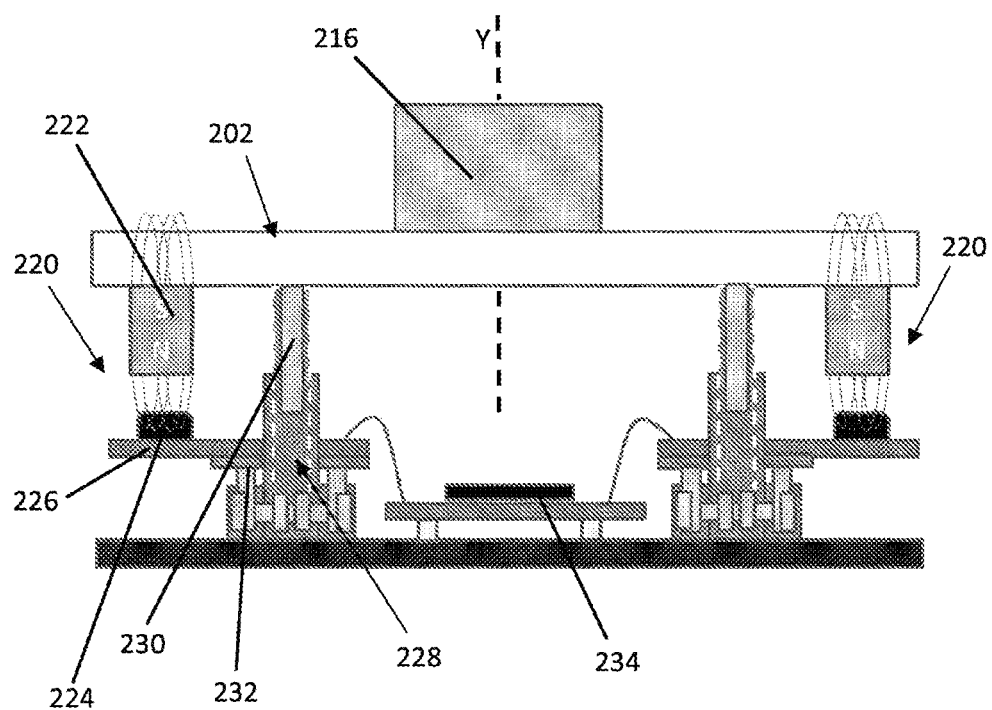
FIG. 2 is a schematic illustration of a side-view of a non-limiting example of an embodiment of the system of the present disclosure.

FIG. 2 is a schematic illustration of a side-view of a non-limiting example of an embodiment of the system of the present disclosure. The system 200 includes a touch-sensitive display unit 202 associated with sensing modules in the form of proximity sensors, in particular hall-effect units 220. Each hall-effect unit 220 includes a first member in the form of a constant magnet 222, and a second member in the form of a hall-effect sensor 224 that is configured to generate a signal that is proportional to the force applied by an object 216 that is placed on the display unit 202. The magnet 222 is attached to an inner face of the display unit 202 and the hall-effect sensor 224 is disposed on a platform 226. Upon application of force on the display unit 202, the display unit 202 displaces, together with the magnet 222, and move towards the hall-effect sensor 224. In this non-limiting example, platform 226 is configured to move in an opposite direction to the movement of display unit 202 such that upon movement of the display unit 202 in a certain direction, along a vertical axis Y, the platform 226 moves at least at the same extent to other direction along the axis, or, at times, a few folds more.

In the example of FIG. 2, the platform 226 is supported by a movement amplifier 228 that includes a first arm 230 that is attached to the display unit 202 and a second arm 232 that is attached to and supporting the platform 226. The movement amplifier 228 is configured such that a movement of the display unit 202 moves the first arm 230 therewith and causes the second arm 232 to move to the other direction, along axis Y, in an extent greater than the movement of the first arm 230 and the display unit 202.

The hall-effect units 220 are connected to a controller 234 that is configured to receive the signals produced by the hall-effect units 220 and generate output signal to be communicated to the display unit 202 and to be displayed thereon.

Figure 3:
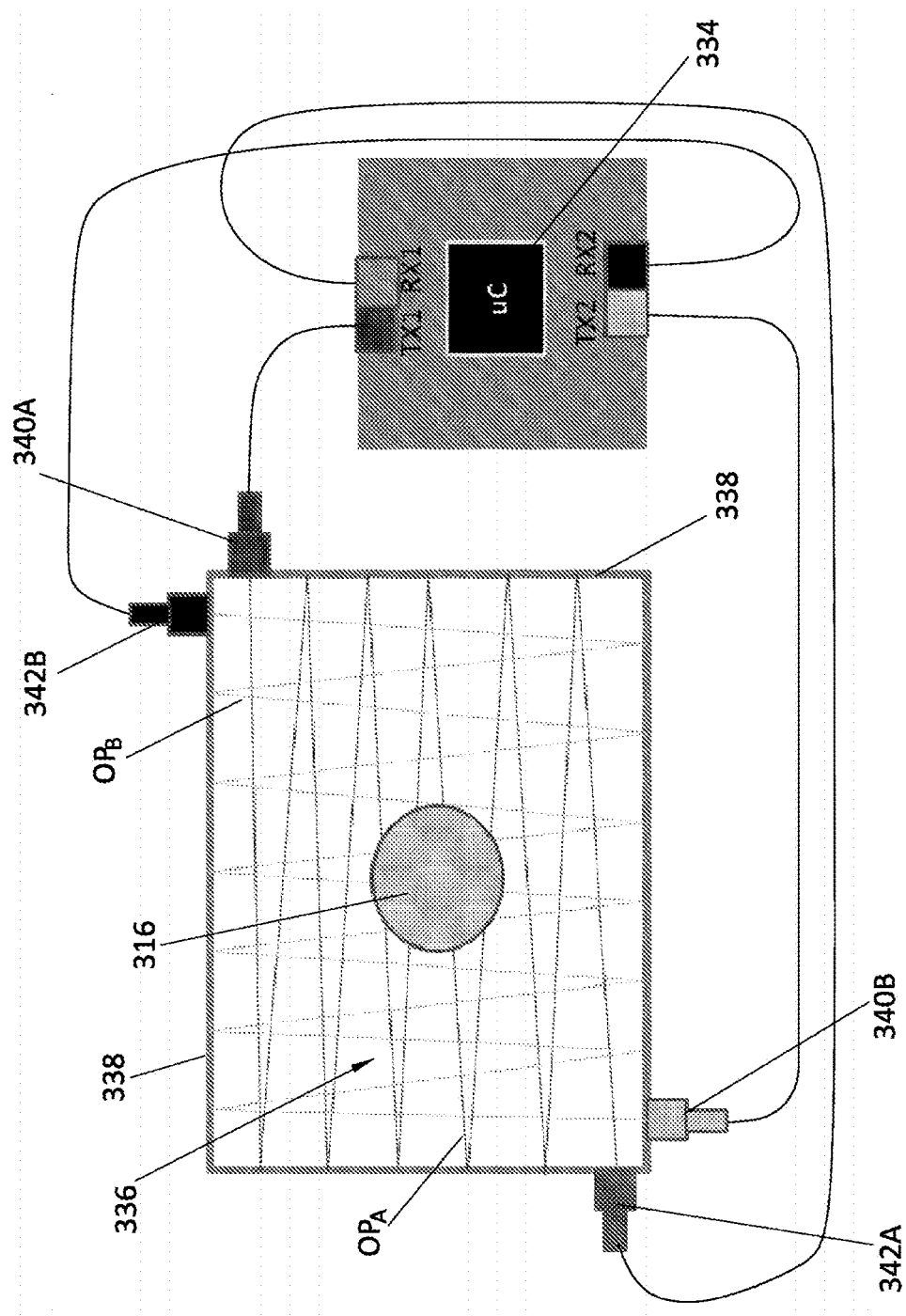
FIG. 3 is a schematic illustration of a non-limiting example of a top-view of a light-based sensing module that is configured to be embedded in the system of the present disclosure.

FIG. 3 is a schematic illustration of a non-limiting example of a top-view of a light-based sensing module that is configured to be embedded in the system of the present disclosure. It is to be noted, that the light-based sensing module may have also the functionality of a touch-sensitive surface and may constitute a component of the display unit.

The light-based sensing module 312 includes a light-transmissive medium 336, such as polycarbonate, polyethylene, acrylonitrile butadiene styrene, polyethylene terephthalate, photonic glasses, etc., that is configured to transmit light of at least predetermined characteristics, e.g. a specific wavelength or range of wavelengths, polarization, direction, time of reception or propagation, etc. The medium 336 is confined by light-reflective edges 338 that are configured to reflect light that propagates within the medium 336. light emitters 340A and 340B, e.g. lasers, are configured to emit light into the medium to propagate along an optical path $OP_A$ and $OP_B$, respectively, on a plane defined by the medium 336. The light emitted from the emitters 340A and 340B reflects from different portions of the edges 338 of the medium 336 until it is received by light detectors 342A and 342B, respectively. The light detectors 342A and 342B transmit light data indicative of the detected signals of the light to a controller 334. The controller is configured to analyze the light data and to identify changes in the characteristics of the light. These changes are indicative of a position of application of force on the medium 336 and/or the amount of force applied on the medium 336, e.g. a weight of an object 316 that is placed on the medium. The object 316 applies pressure on the medium 336 that affect the propagation of the light within the medium 336 and changes the characteristics thereof. As can be appreciated, the light emitters and the light detectors are configured such that the optical paths $OP_A$ and $OP_B$ spans a major portion of the medium 336, to allow the sensing from any portion of the medium 336. This may be obtained, for example, by positioning each light emitter and light detector couple at opposite edges of the edges 338 of the medium 336.

The light-based sensing module 312 is configured to be placed on a display unit (not shown) and for association therewith, namely the sensed data that is generated by the light-based sensing module 312 is fed to the display unit to affect an image displayed thereon.

Figure 4:
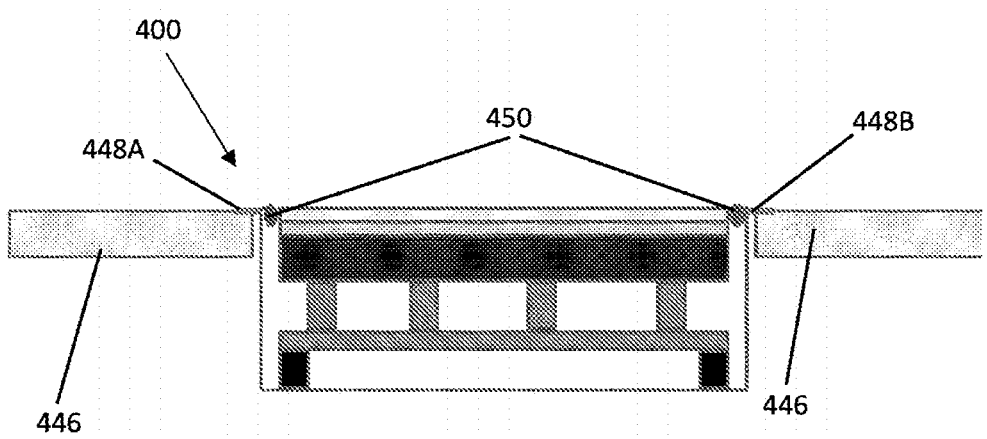
FIG. 4 is a schematic illustration of a longitudinal cross-section of an embodiment of the system according to the present disclosure.

FIG. 4 is a schematic illustration of a longitudinal cross-section of an embodiment of the system according to the present disclosure. This figure differs from FIG. 1 by including a suspended structure 444 that is configured to be suspended on an external support structure 446 by arms 448A and 448B. The system 400 is disposed on the bottom of the suspended structure 444. A sealing element 450 is formed between the display unit 412 and a wall of the suspended structure 444 for preventing liquids and other undesired substances to penetrate to the gaps between the suspended structure 444 and the system 400 that may cause damage to the system 400.

Figure 5A:
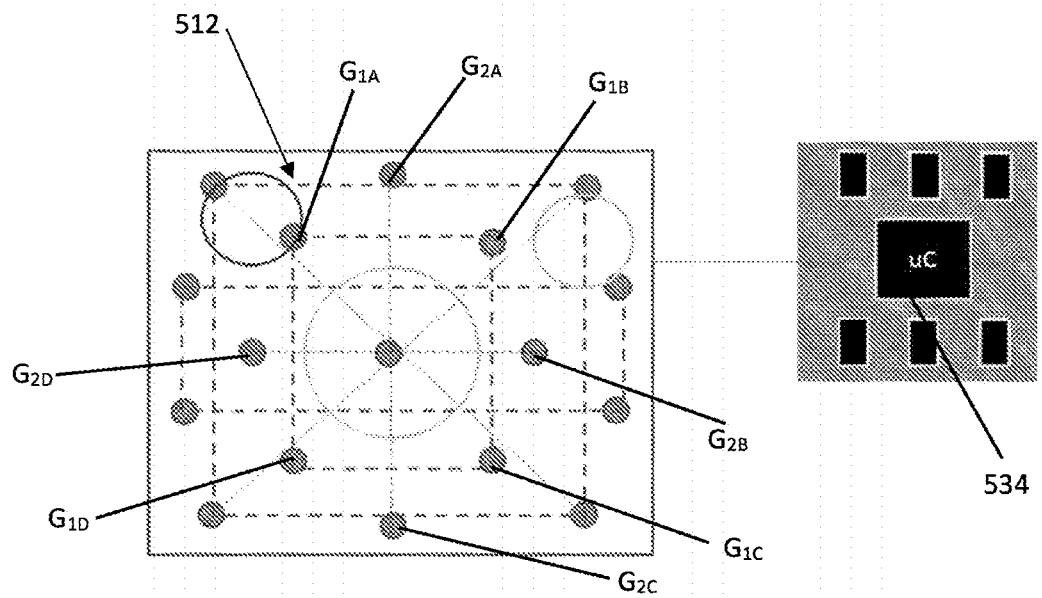
FIGS. 5A-5B are schematic illustrations exemplifying arrangement of the sensing modules to be associated with different portions of the display unit.
Figure 5B:
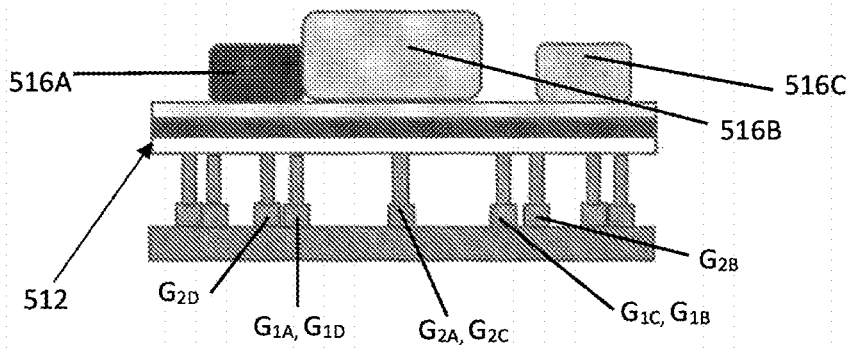

FIGS. 5A-5B are schematic illustrations exemplifying arrangement of the sensing modules, e.g. proximity sensors or load cells, to be associated with different portions of the display unit. FIG. 5A shows a top-view of the arrangement and FIG. 5B shows a side-view of the same arrangement. The circles in FIG. 5A marks the positions of the weighed objects that are placed on the display unit 502 in FIG. 5B.

The sensing modules are grouped in sub-arrays. Each sub-array includes a plurality of sensors that are arranged in a symmetry orientation with one another. For example, fours sensing modules $G_{1A}$, $G_{1B}$, $G_{1C}$, $G_{1D}$, are members of a first sub-array and four sensing modules $G_{2A}$, $G_{2B}$, $G_{1C}$, $G_{2D}$, are members of a second sub-array. The first and the second sub-array are non-symmetric with respect to one another and have no linear relation one to the other. This arrangement permits multi-weighing of objects that are placed on the display unit 502. As can be appreciated, each object 516A, 516B and 516C is associated with different sensing modules and different weighting factor of the sensed signal of the sensing modules is applied for each weighed object.

Figure 6:
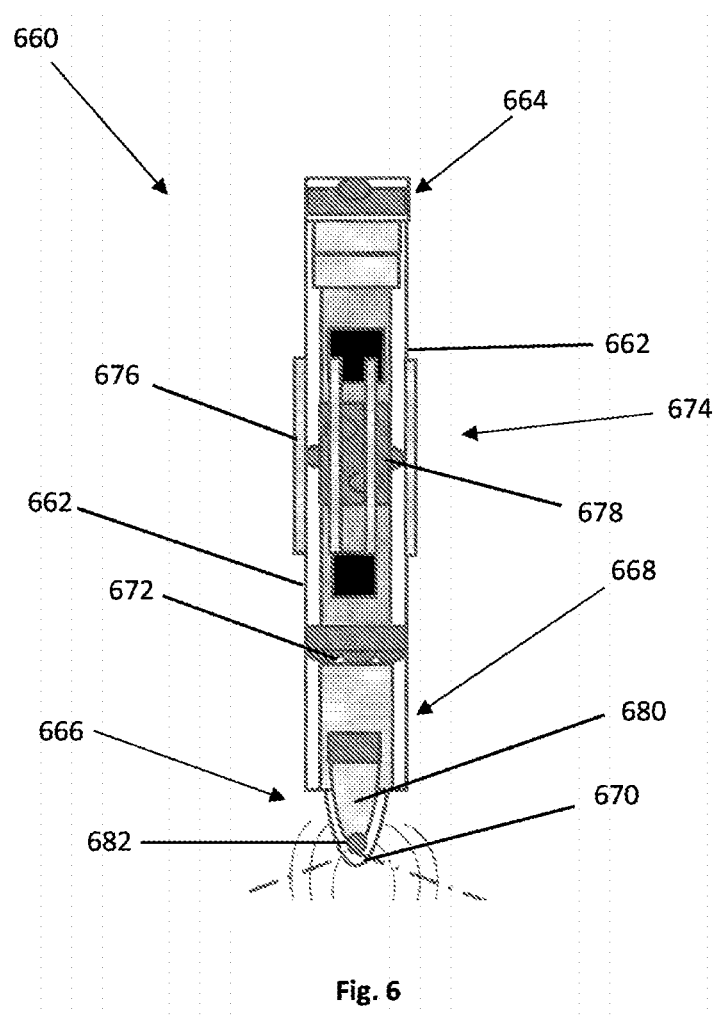
FIG. 6 is a schematic illustration of a side-view of anon-limiting example of a hand-held tool for operating a touch-sensitive display unit.

FIG. 6 is a schematic illustration of a side-view of anon-limiting example of a hand-held tool, e.g. a stylus, for operating a touch-sensitive display unit. The tool 660 includes an elongated body 662 extending between a proximal end 664 and a distal end 666. An engagement portion 668 is formed on the distal end 666 and is configured for affecting the touch-sensitive display unit upon engagement with the touch-sensitive display unit (not shown). The engagement portion 668 includes a tip 670 that is configured for making the contact with the touch-sensitive display unit and further includes a first pressure/force-sensitive unit 672 that is configured to sense the pressure applied by the tip 670 on the touch-sensitive display unit.

It is to be noted, that the terms pressure and force may be interchangeably used throughout the description.

The elongated body 662 further includes a gripping portion 674 between the proximal and distal ends. The gripping portion 674 includes a gripping unit 676 that is configured to transmit pressure applied thereon to a second pressure/force-sensitive unit 678 that is associated with the gripping unit 676.

As can be appreciated, the gripping unit 676 and the force-sensitive unit 678 are circumferentially formed around the elongated body 662 to allow the sensing of pressure from each portion of the circumference of the external surface of the gripping portion 674 of the elongated body 662.

The first and the second pressure-sensitive units 672 and 676 are configured to generate first and second pressure signals indicative of pressure applied by the tip and by a gripping of a user respectively. The tool 660 includes a communication module (not shown) that is configured to transmit the first and second signals to the display unit to affect an image that is displayed thereon, based on the signals.

The engagement portion 668 further includes a capacitance sensor 680 that is configured to sense the proximity from the display unit and/or the rate of movement of the tool 660 with respect to the display unit. The capacitance sensor 680 is disposed at the vicinity of the tip 670. Furthermore, the engagement portion includes a camera unit 682 for capturing videos or images and communicate it to the display unit to be displayed thereby. The camera unit 682 is further configured to image portions of the display unit, specifically, portions of the displayed image on the display unit and transmit them to the display unit for affecting the displayed image that is captured or manipulate the captured image on the display.

Figure 7:
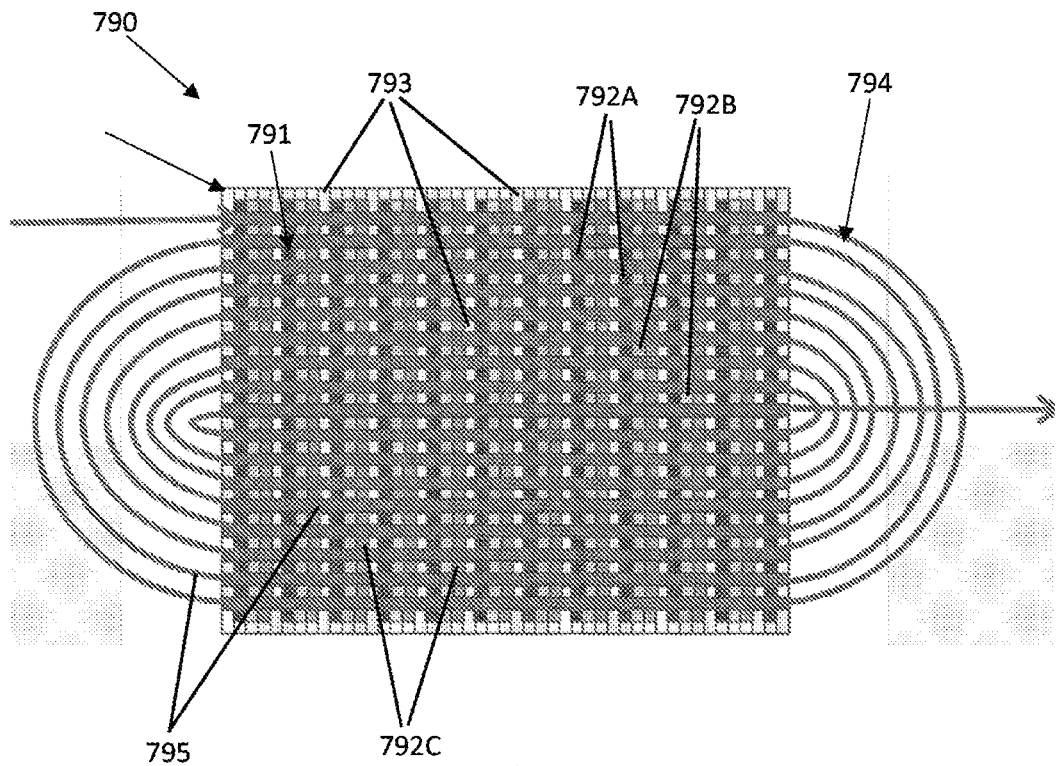
FIG. 7 is a schematic illustration of a non-limiting example of a top-view of an induction system according to the present disclosure.

FIG. 7 is a schematic illustration of a non-limiting example of a top-view of an induction system according to the present disclosure. The system 790 includes a display unit layer 791 that is formed of display components 792A, 792B and 792C, such as LEDs. On the display unit layer 791, an electromagnetic-blocking layer 793 is formed to block, at least partially, the electromagnetic induction that is generated by a generating induction layer 794 that is formed on the electromagnetic-blocking layer 793. The electromagnetic-blocking layer 793 has a formation of a lattice that allows the display components to be visualized therethrough. As can be appreciated, the generating induction layer 794 includes an induction coil 795 that is formed with spaced apart portions that are matching to the lattice formation to allow the visualization of the display unit, and specifically the display components, therethrough.

Figure 8:
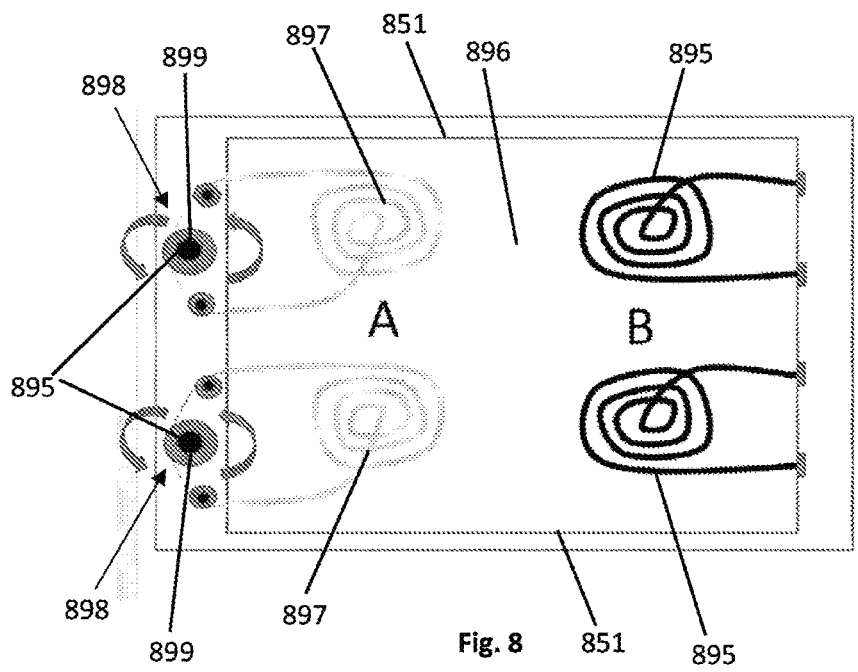
FIG. 8 is a schematic illustration of a non-limiting example of a top-view of an embodiment of realization of the induction system according to the present disclosure.

FIG. 8 is a schematic illustration of a non-limiting example of a top-view of an embodiment of realization of the induction system according to the present disclosure. The left side of the figure, which is marked in A, exemplify an embodiment in which the induction coil 895 is retractable. A glass medium 896 includes an induction space 897 that is having the shape of the coil. A retraction mechanism 898 is configured to control the retraction and extraction of the induction coil 895, into and out of the induction space 897. When the induction coil is retracted, it is stored in a retraction space 899 that does not interrupt the visualization of the display unit that is formed below boundaries 851.

The right side of FIG. 8, marked in B, exemplifies an embodiment that the induction coil 895 is constantly formed within the glass medium 896.

The invention claimed is:

1. A system comprising:
a touch-sensitive display unit for displaying an image and configured to detect a touch of one or more objects onto said unit to thereby affect said image;
one or more sensing modules associated with the touch-sensitive display unit and configured to generate a sensed signal proportional to a force applied onto said unit in a direction normal to its surface; and one or more control units coupled to the one or more modules and to said display unit and configured to receive said sensed signal and generate an output signal indicative of said force based thereon that is fed into the touch-sensitive display unit to display data on said force;

wherein the sensing modules are arranged in an irregular array, said irregular array comprises sub-arrays, each sub-array comprises an internal linear arrangement, and wherein each sub-array is arranged in a non-linear arrangement with respect to one or more other sub-arrays.

2. The system of claim 1, wherein the display unit is planar and is configured for horizontal orientation to define a planar outer face and for determining weight of objects placed thereon.

3. The system of claim 1, wherein at least one of the sensing modules comprises a proximity sensor having a first member associated and movable with the display unit and a second member; wherein the sensed signal is proportional to the proximity between the two members.

4. The system of claim 3, wherein the two members define a hall-effect sensor couple.

5. The system of claim 3, wherein the second member is disposed on a displaceable platform configured to displace towards the display unit to an extent proportional to said force, wherein a portion of the display unit is displaced in a first extent proportional to the force applied onto said unit and said platform is displaced in a second, amplified extent.

6. The system of claim 1, wherein at least one of the sensing modules comprises a load cell that is configured to sense the force applied on the touch-sensitive display unit and generate said sensed signal.

7. The system of claim 6, wherein the display unit is horizontal and the system comprises a plurality of load cells fixed on a base structure and supporting the display unit.

8. The system of claim 7, wherein the base structure comprises a levelling arrangement for levelling thereof.

9. The system of claim 1, comprising suspension arms for allowing suspension of the system on a support structure such that the surface of the system is flush with the support structure.

10. The system of claim 1, comprising
a touch-sensitive display unit that defines a planar outer face;
a planar light-transmissive medium permitting transmission of light in a direction parallel to said outer face;
one or more light emitters configured to emit light into the medium and one or more light detectors configured to detect light from at least one of the emitters, wherein changes in characteristics of the light detected by a detector is indicative of at least one of (i) degree of force applied on the touch-sensitive display unit and (ii) the location where the force is applied onto the touch-sensitive display unit.

11. The system of claim 10, wherein
the light-transmissive medium comprises light-reflective edges; and wherein
the optical path of said light between the emitter and the detector comprises multiple reflections from said light-reflective edges.

12. The system of claim 11, wherein the optical path spans throughout a major portion of the medium.

13. The system of claim 12, wherein
said medium is rectangular;
the light emitters and the lights detectors are two members of an optical couple, in which the detector is configured to detect the light from its coupled emitter; and wherein one member of the couple being disposed proximal to one edge and the other at the opposite edge of the rectangle.

14. The system of claim 1, being configured to measure weights of a plurality of objects simultaneously.

15. The system of claim 1, comprising an induction system that comprises:
an induction-generating layer configured for generating an electromagnetic induction;
an electromagnetic-blocking layer formed between the display unit layer and the induction-generating layer and configured for blocking at least a portion of the electromagnetic induction that is generated by the induction-generating layer;
wherein the layers are formed such that displaying components of the display unit are visible through the induction-generating layer and the electromagnetic-blocking layer.

16. The system of claim 15, wherein the electromagnetic-blocking layer is having a latticed formation.

17. The system of claim 15, wherein the induction-generating layer comprises an induction element that is formed within a medium, said induction element is disposed in an induction space within said medium and is configured for retraction from said induction space into a retracted space.

18. The system of claim 17, wherein the retracted space is positioned outside vertical boundaries of the display unit layer.

19. A system comprising:
a touch-sensitive display unit for displaying an image and configured to detect a touch of one or more objects onto said unit to thereby affect said image;
one or more sensing modules associated with the touch-sensitive display unit and configured to generate a sensed signal proportional to a force applied onto said unit in a direction normal to its surface; and
one or more control units coupled to the one or more modules and to said display unit and configured to receive said sensed signal and generate an output signal indicative of said force based thereon that is fed into the touch-sensitive display unit to display data on said force;
wherein at least one of the sensing modules comprises a proximity sensor having a first member associated and movable with the display unit and a second member;
wherein the sensed signal is proportional to the proximity between the two members.

20. A system comprising:
a touch-sensitive display unit for displaying an image and configured to detect a touch of one or more objects onto said unit to thereby affect said image;
one or more sensing modules associated with the touch-sensitive display unit and configured to generate a sensed signal proportional to a force applied onto said unit in a direction normal to its surface; and
one or more control units coupled to the one or more modules and to said display unit and configured to receive said sensed signal and generate an output signal indicative of said force based thereon that is fed into the touch-sensitive display unit to display data on said force;
an induction-generating layer configured for generating an electromagnetic induction;

an electromagnetic-blocking layer formed between the display unit layer and the induction-generating layer and configured for blocking at least a portion of the electromagnetic induction that is generated by the induction-generating layer;

wherein the layers are formed such that displaying components of the display unit are visible through the induction-generating layer and the electromagnetic-blocking layer.

\* \* \* \* \*